United States Patent [19]
Novotny et al.

[11] Patent Number: 6,069,853
[45] Date of Patent: May 30, 2000

[54] HEAD INCLUDING A HEATING ELEMENT FOR REDUCING SIGNAL DISTORTION IN DATA STORAGE SYSTEMS

[75] Inventors: Vlad Novotny, Los Gatos; David Diepersloot, Scotts Valley; Roger Hajjar, Santa Clara; Bernard W. Bell, Jr., Scotts Valley, all of Calif.

[73] Assignee: TeraStor Corporation, San Jose, Calif.

[21] Appl. No.: 09/227,778

[22] Filed: Jan. 8, 1999

Related U.S. Application Data

[60] Provisional application No. 60/097,548, Aug. 21, 1998.
[51] Int. Cl.⁷ ........................................ G11B 11/00
[52] U.S. Cl. ............................... 369/13; 369/112
[58] Field of Search .................. 369/13, 14, 110, 369/116, 44.11, 44.14, 112, 120; 360/59, 114

[56] References Cited

U.S. PATENT DOCUMENTS

| | | | |
|---|---|---|---|
| 5,182,742 | 1/1993 | Ohmori et al. | 369/116 |
| 5,233,596 | 8/1993 | Tani | 369/116 |
| 5,297,128 | 3/1994 | Yamaguchi et al. | 369/116 |
| 5,329,512 | 7/1994 | Fukimoto et al. | 369/121 |
| 5,461,603 | 10/1995 | Otsuka | 369/120 |

*Primary Examiner*—Tan Dinh
*Attorney, Agent, or Firm*—Fish & Richardson P.C.

[57] ABSTRACT

A device for retrieving data from or writing data to a storage medium that includes a heating element to reduce signal distortion in a data storage system. The device includes a head having an interfacing surface that faces a medium surface of the storage medium and interacts with the storage medium. The heating element is disposed on or near the interfacing surface to supply thermal energy to the interfacing surface maintain said interfacing surface at a temperature higher than a temperature of the medium surface.

63 Claims, 11 Drawing Sheets

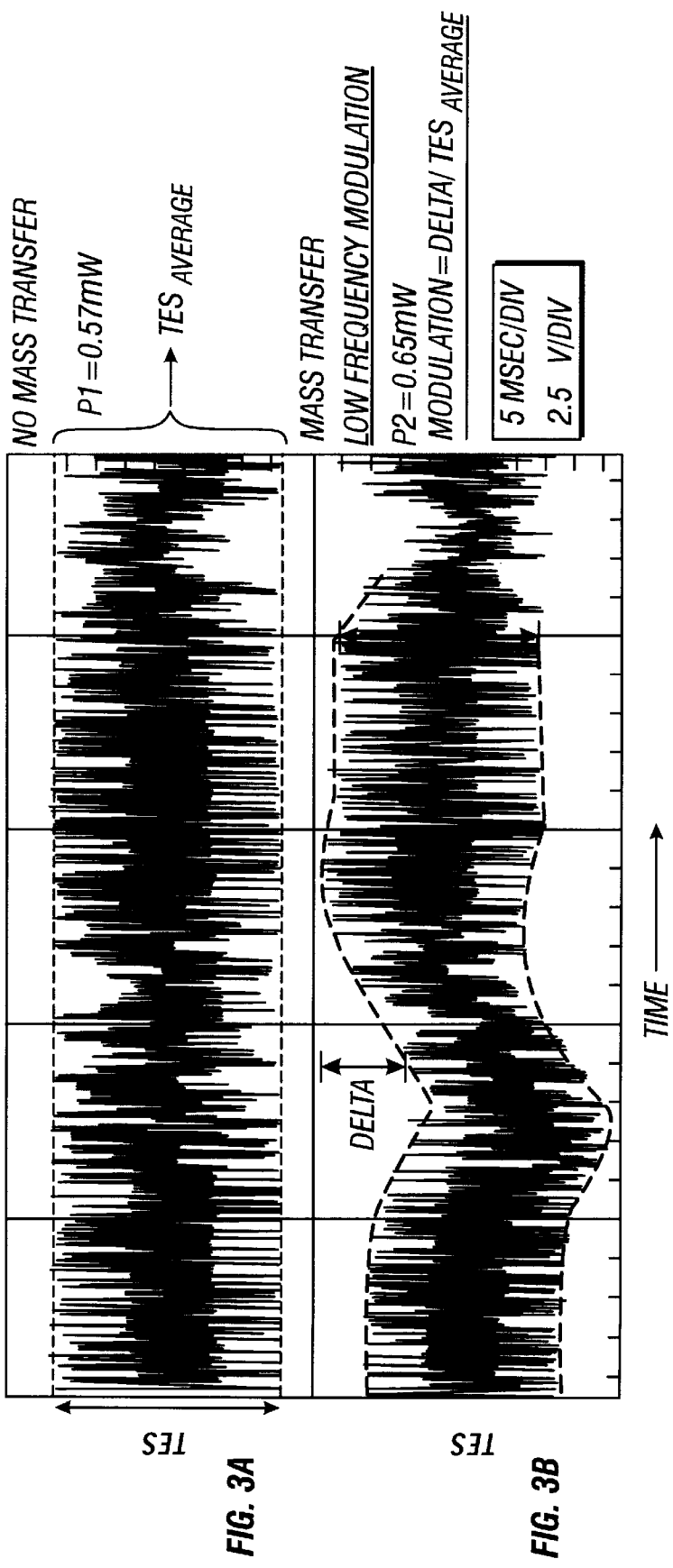

HEAD INCLUDING A HEATING ELEMENT FOR REDUCING SIGNAL DISTORTION IN DATA STORAGE SYSTEMS

This application claims the benefit of the U.S. Provisional Application No. 60/097,548, entitled "Optical Recording Heads with Surface and Bulk Heaters," filed on Aug. 21, 1998, which is incorporated herein by reference.

FIELD OF THE INVENTION

The present system generally relates to data storage, and more particularly, to a read/write head that couples radiation energy or other signals to and from a storage medium.

BACKGROUND

Optical storage can achieve high areal density data storage by using a tightly focused laser beam. Magneto-optical materials, for example, can be used to produce an areal data density of up to or higher than about ten gigabits per square inch. A typical optical storage system usually focuses a monochromatic optical beam to a small spot on a recording layer by using an optical head with a large numerical aperture. The optical head is conventionally positioned over the medium by a spacing greater than one wavelength. This is called a "far-field" optical configuration.

For a given wavelength, the areal data density of an optical storage system can be increased by focusing an optical beam onto a flat surface of a solid transparent material with a high refractive index that is implemented in the optical head. The diffraction-limited focused spot size is hence reduced by a factor of the refractive index compared to the spot size in air.

An optical storage system can also be configured to operate in a "near-field" configuration where the optical head and the optical medium are spaced from each other by a distance on the order of or less than one wavelength. The optical coupling between the optical head and the medium, therefore, can be effected by evanescent optical coupling, which is not possible in a far-field configuration. A numerical aperture of the optical head in such a near-field configuration can be greater than unity. Hence, a near-field optical storage system can be used to achieve a focused beam spot size less than one wavelength and to realize a high areal storage density beyond the capability of many far-field systems. U.S. Pat. No. 5,125,750 to Corle and Kino discloses a near-field optical recording system based on a solid immersion lens.

Whichever optical configurations are implemented, the design and construction of the optical head are often critical to the performance of an optical storage system. Certain aspects of the optical head design and the optical storage system are described by Alan B. Marchant, in "Optical Recording," Addison-Wesley Publishing (1990). In addition to the focusing of a read/write beam, the properties of the optical head may also affect other operations of the system including the signal detection and beam tracking on the data tracks.

SUMMARY

The present disclosure provides a data storage system having a heated head that reads data from and writes data to a storage medium. The head interacts with the storage medium through an interfacing surface in the head and accesses the storage medium through a medium surface. The interfacing surface in the head is heated to a temperature higher than a desorption temperature below which certain species become adsorbed to the interfacing surface. Material adsorption on the interfacing surface can adversely distort the signals coupled between the head and the storage medium. Therefore, proper heating of the head can reduce the signal distortion and improve the signal coupling between the head the storage medium.

The head may be an optical head or a magnetic head. In a preferred embodiment of the optical head, the optical head is spaced from the surface of the medium by an air gap less than one wavelength in thickness. In this case, the optical coupling between the optical head and the optical medium is effected at least in part by evanescent coupling through the air gap.

In many optical storage systems, an optical beam from the optical head is focused onto the medium and causes localized heating at and near the focused spot. This localized heating can modify certain properties of the interface of the optical head and the optical medium. For example, certain species desorb from the medium surface due to the localized heating and adhere to the optical head. The effects of the localized heating can include distortion in the signals coupled between the optical head and the medium. This can adversely affect the performance of the system.

In one aspect, the disclosure provides thermal energy to heat the head by implementing an electrical heater on the head. A surface heater or a bulk heater may be used either individually or in combination. In a magneto-optical drive, the heat dissipation from the magneto-optical coil located in the optical head may be used for heating.

In another aspect, optical heating based on absorption of optical radiation is provided. A light-absorbing layer is formed on the head. In an optical storage system, such optical heating may be implemented either by light absorption of the radiation energy used for reading and writing data or by light absorption of another heating radiation beam at a different wavelength. In the latter implementation, the light-absorbing layer may be formed by a material that is substantially transparent to the radiation energy for reading and writing data but is absorbing at the wavelength of the heating radiation beam.

These and other aspects and associated advantages of the present invention will become more apparent in light of the following detailed description, the accompanying drawings, and the appended claims.

BRIEF DESCRIPTION OF THE DRAWINGS

FIGS. 3A and 3B show measured tracking error signal data at two different laser power levels in a magneto-optical disk drive in a near-field configuration based on FIG. 1.

DETAILED DESCRIPTION OF THE PREFERRED EMBODIMENTS

Figure 1:
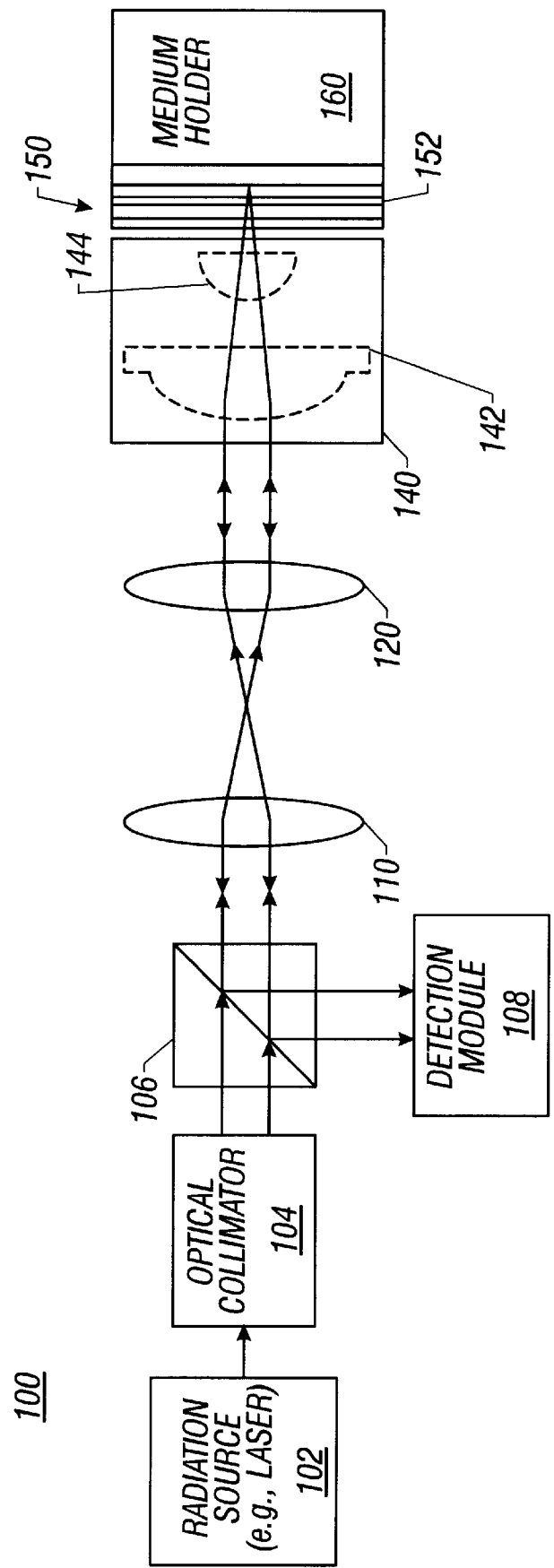
FIG. 1 shows one embodiment of an optical storage system.

FIG. 1 shows an optical train 100 of an optical storage system in accordance with one embodiment. A radiation source 102 such as a laser produces a beam at a specified wavelength for recording and retrieving data. An optical medium 150 (e.g., a disk) is configured to include a recording layer 152 (e.g., formed of a magneto-optical material or phase-changing material) for data storage. Data is spatially distributed and stored in the recording layer 152 by a suitable encoding method. An optical beam from the radiation source 102 is collimated by an optical collimator 104 and then projected to an optical head 140 by a relay lens 110 and an imaging lens 120.

A medium holder 160 is implemented to hold the optical medium 150 relative to the optical head 140 at a desired distance so that the optical energy can be properly coupled between the optical head 140 and the medium 150. The optical medium 150 may be a removable medium or a fixed medium.

The optical head 140 is configured to produce a lensing effect and thereby to focus the beam to the recording layer 152 and to couple the reflected beam to a detection module 108. A preferred implementation of the optical head 140 uses an objective lens 142 and a near-field lens 144 to couple the beam to and from the optical medium 150. The near-field lens 144 is preferably made of a high-index optical material to produce a large effective numerical aperture ("NA"), i.e., NA=n sin $\theta_0$, where n is the refractive index of the near-field lens 144 and $\theta_0$ is the maximum ray angle from the lens 144 to the focus point. For example, a solid immersion lens ("SIL"), a graded index lens ("GRIN lens") or a "Gradium lens" may be used as the near field lens 144 to achieve a NA up to and greater than unity.

FIG. 1 illustrates a hemispherical SIL as an example of the near-field lens 144.

The near-field lens 144 and the optical medium 150 are spaced from each other by an air gap less than one wavelength of the light produced by light source 102. This is known as a "near-field" configuration. Optical energy can be coupled between the near-field lens 144 and the optical medium 150 by both light propagation and evanescent waves through the thin air gap therebetween. In a near-field optical disk drive, the optical head 140 can be made compact and lightweight so that it can be suspended over the optical medium 150 (i.e., an optical disk). In operation, the optical medium 150 spins at a high speed and the optical head floats over the disk at a height less than one wavelength (e.g., in a range from about 50 nm to about 200 nm).

A beam splitter 106 can be disposed to guide a reflected beam from the optical medium 150 to the detection module 108 which has detectors for both data extraction and beam tracking. The output beam from the radiation source 102 may be polarized and the beam splitter 106 may be a polarizing prism in order to direct the reflected beam to the detection module 108 by using a polarization rotator (e.g., a quarter wave plate between the beam splitter 106 and the optical medium 150).

A number of implementations of the system 100 in FIG. 1 and their operations are described in U.S. patent application Ser. No. 08/846,916, "Electro-optical storage system with flying head for near-field recording and reading," filed on Apr. 29, 1997. Designs of optical heads with a solid-immersion lens for near-field recording are disclosed in U.S. patent application Ser. No. 08/926,907, filed on Sep. 9, 1997. Both applications are incorporated herein by reference.

An optical disk storage drive is a common optical storage system in which the medium is a disk. Data is imprinted on the disk in a data track between two tracking grooves usually in a spiral or concentric configuration. During a readout, a segment of a data track can modulate the phase or intensity distribution of a read beam reflected from the optical disk. This modulation effectively superimposes the data stored in the data track onto the beam. Conversely, during a writing process, the write beam can be modulated to alter states of the recording medium to record data on the data track.

The tracking grooves produce certain tracking patterns associated with the relative positioning of a read/write beam with respect to two adjacent tracking grooves in the reflected beam. The detector module 108 has a tracking servo detector for sensing the reflected beam to generate a tracking error signal to indicate the direction and the amount of deviation of the beam position with respect to the center line of a data track. This tracking error signal is then used by a tracking servo module to steer the beam to reduce the deviation and to maintain the beam at a desired track.

One scheme to produce the tracking error signal is by interfering the diffracted beams with the zero-order reflected beam from a grating formed by the tracking grooves to generate the tracking patterns. For example, the (±1) diffracted beams within the aperture of the near-field lens can interfere with the zero-order reflected beam to form two interference patterns.

Figure 2A:
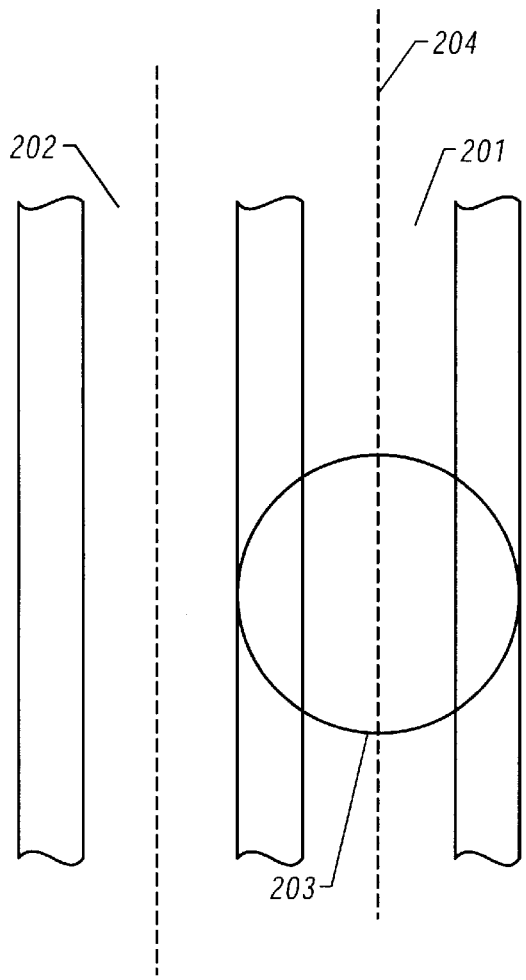
FIGS. 2A and 2B illustrate generation of the tracking error signal by a split detector in the optical system shown in FIG. 1.
Figure 2B:
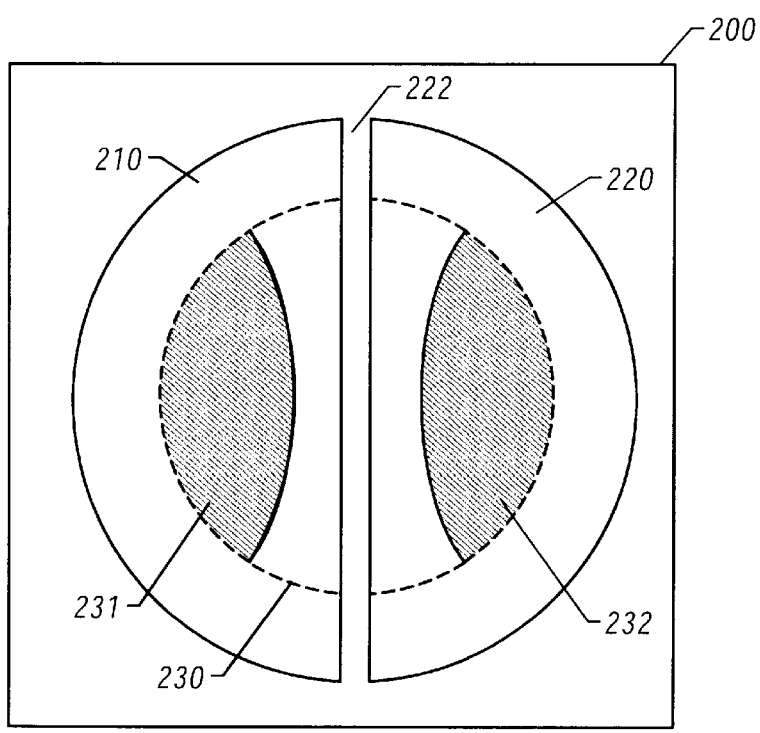

A tracking error signal may be detected by using a split detector scheme. FIG. 2A shows enlarged segments of two adjacent tracks 201 and 202 on the optical disk. Dashed line 204 parallel to the tracks represents the desired center track of the read/write beam which is parallel to the tracks in the medium. A beam projects a spot 203 on the disk by passing through the optical train. FIG. 2B shows a split detector 200 having a first sensor 210 and a second sensor 220 that are split along a direction parallel to the tracks 201 and 202. Alternatively, a split detector may include four separate sensors that are arranged in a symmetric configuration with two sensors to sense one side of the desired track and the other two sensors to sense another side. Features 231 and 232 indicate the interference patterns in the reflected beam and are used to track the beam. The tracking error signal indicates the difference between the output signals of sensors 210 and 220. If the spot of the read beam is right at the center of the two tracks, the tracking signals from the sensors 210 and 220 are identical and the difference is zero. If the beam is positioned off the center line between two adjacent tracks, a non-zero difference signal is generated. The tracking servo module maintains the beam spot at the desired track by reducing or minimizing this difference signal through steering the beam.

For convenience, the tracking error signal may be divided by the total signal detected by the split detector to obtain a normalized tracking error signal. The sign and magnitude of the normalized tracking error signal are thus used for tracking operations. One advantage of using normalized tracking error signal instead of tracking error signal is that the variation in the beam power is automatically compensated so that the magnitude of the normalized tracking error signal can be used to determine the amount of beam offset for different power levels of the read/write beam.

The normalized tracking error signal is in general a sinusoidal signal with a period corresponding to twice the spatial period of the tracking grooves (i.e., groove pitch).

The sign and magnitude of the averaged DC value of the normalized tracking error signal are used to indicate the beam deviation from a desired track. In a practical implementation, beam tracking may be considered satisfactory if the averaged DC value of the normalized tracking error signal is within a certain tolerance range. Unless otherwise specifically identified, "tracking error signal" will be used in the following description to represent both the tracking error signal and the normalized tracking error signal.

Any distortion in the tracking error signal can be adverse to the beam tracking since a non-zero offset in the averaged DC value of the tracking error signal can be caused by the distortion to indicate a false deviation of a read/write beam even when the beam is actually on a desired track. The distortion in the tracking error signal not only can degrade the performance of the system but also may cause malfunction of the system. Hence, it is desirable to reduce or eliminate such distortion.

It has been discovered that the distortion in the tracking error signal can be caused by localized heating at or near the focused spot on the optical medium 150 due to absorption of light. This localized heating can modify certain properties of the optical medium 150 and the optical head 140 especially when the head and medium are close. This also changes characteristics of the interfacing between the optical head 140 and the medium 150. Distortion may result. When the spacing between the optical head 140 and the medium 150 is smaller than one wavelength, the effect of the localized heating on the interfacing between the optical head 140 and the medium 150 can become more significant. Therefore, the associated distortion in the tracking error signal can become more problematic in a near-field configuration.

Experimental measurements have shown that the distortion in the tracking error signal detected by the detection module 108 has a dependence on the power of the laser beam coupled to the optical storage medium 150, when the power received by the medium 150 is above a threshold power.

FIGS. 3A and 3B are charts of measured data showing this effect. A near-field system similar to the system 100 in FIG. 1 was used to obtain the data in FIGS. 3A and 3B. A diode laser was used as the light source 102. The laser power was measured at the output the laser. The optical medium 150 was a multilayer magneto-optical ("MO") disk having a structure as follows:

Carbon layer/$Si_3N_4$/MO/Al/Substrate, in which the top carbon overcoat layer is about 10 nm thick, the $Si_3N_4$ dielectric layer is about 30 to 50 nm thick, the MO layer is about 20 to 30 nm thick, and the aluminum reflecting layer is about 50 to 60 nm. The substrate is formed of a plastic layer of about 2 mm thick.

When the output power of the diode laser is low, at about 0.57 mW, the envelope of the measured tracking error signal does not change significantly when the tracking servo module is not turned on. This is shown by the measured tracking error signal in FIG. 3A as indicated by the dashed line. However, when the diode laser power increases to 0.65 mW while the beam remains at the same position over the disk without control from the tracking servo module, the averaged DC value of the tracking error signal exhibits a variation as shown in the trace of FIG. 3B. This variation often appears to oscillate at a low modulation period of about the period of the disk rotation (e.g., 1/75 $msec^{-1}$). This variation in the tracking error signal is caused by distortion. This represents a false tracking error since the beam in fact remains at the same position over the disk.

Under normal operation, when the tracking servo module is turned on, the above distortion in the tracking error signal can falsely indicate that the beam is off a desired track when the beam is in fact on the desired track. The tracking servo module can thus be promoted to steer the beam away from the desired track. This can cause the beam to either locate at a wrong track or lose tracking completely.

The distortion of the tracking error signal represents only one of many undesirable consequences caused by the localized heating. In general, any optical signal passing through the interface between the optical head and the medium is adversely affected or distorted, including the read-only optical signal, the magneto-optic signal for a magneto-optic drive, the phase change signal for a drive based on phase change recording media, or writing signals. The signal distortion can lead to loss of tracking, track misregistration, data jitter, reduction in the signal-to-noise ratio, or other problems that can degrade the performance or cause malfunction of the system.

The above distortion caused by the localized heating has not been fully understood. Different explanations may be possible. One postulation is mass transport from the surface of the optical medium to the surface of the near-field lens. However, it should be understood that various embodiments of the invention are not limited by this theory and may be explained by other postulations. For example, another theory that may explain the distortions is that the localized heating may cause changes in the indices of refraction of the optical head, the air gap and the optical medium, or cause bumps or bubbles on or near the surface of the head/lens. The theory of mass transport is used in the following description to facilitate understanding only.

A species can be adsorbed to a surface when the temperature of the surface is below a threshold temperature, "desorption temperature." If the surface temperature reaches to or is above the desorption temperature, the thermal kinetic energy of the adsorbed species becomes equal to or greater than the binding energy of the surface. Therefore, the species is desorbed from the surface and travels elsewhere. Different species may have different binding energies or desorption temperatures with respect to the same surface. In addition, different surface sites have different binding energies for a given specie. When a surface is maintained at a selected temperature, species with desorption temperatures above that selected temperature are desorbed while species with desorption temperatures below that selected temperature remain adsorbed on the surface.

In the near-field system 100 shown in FIG. 1, absorption of light by the recording layer 152 causes the temperature of the medium surface to rise. Certain species may be desorbed from the medium surface due to this rise of temperature. These desorbed species travel in the space between the optical head 140 and the medium 150 and can reach the surface of the optical head 140. Since the spacing between the optical head 140 and the optical medium 150 is less than one wavelength, much smaller than or comparable with the typical mean-free-path of the desorbed species under normal operating conditions of the system 100, the probability for these desorbed species to reach the surface of the optical head 140 is high.

A desorbed species becomes adsorbed by the optical head 140 if the head surface temperature is below the desorption temperature for that particular species at that surface. As the amount of the species builds up on the surface of the optical head 140, the adsorbed species in the optical path between the optical head 140 and the optical medium 150 can affect any optical signal transmitted to or reflected from the optical medium 150.

Since the surface temperature of the optical medium depends on the laser power at the recording layer 152, the amount of desorbed species and the number of desorbed species from the medium surface are dependent on the surface temperature and therefore the laser power. In addition, the amount of adsorbed species on the surface of the optical head 140 increase with the amount of desorbed species from the medium surface. Thus, the amount of the adsorbed species on the optical head 140 depends on the laser power. This dependence on the laser power is believed to contribute to the power-dependent signal distortion.

Figure 4A:
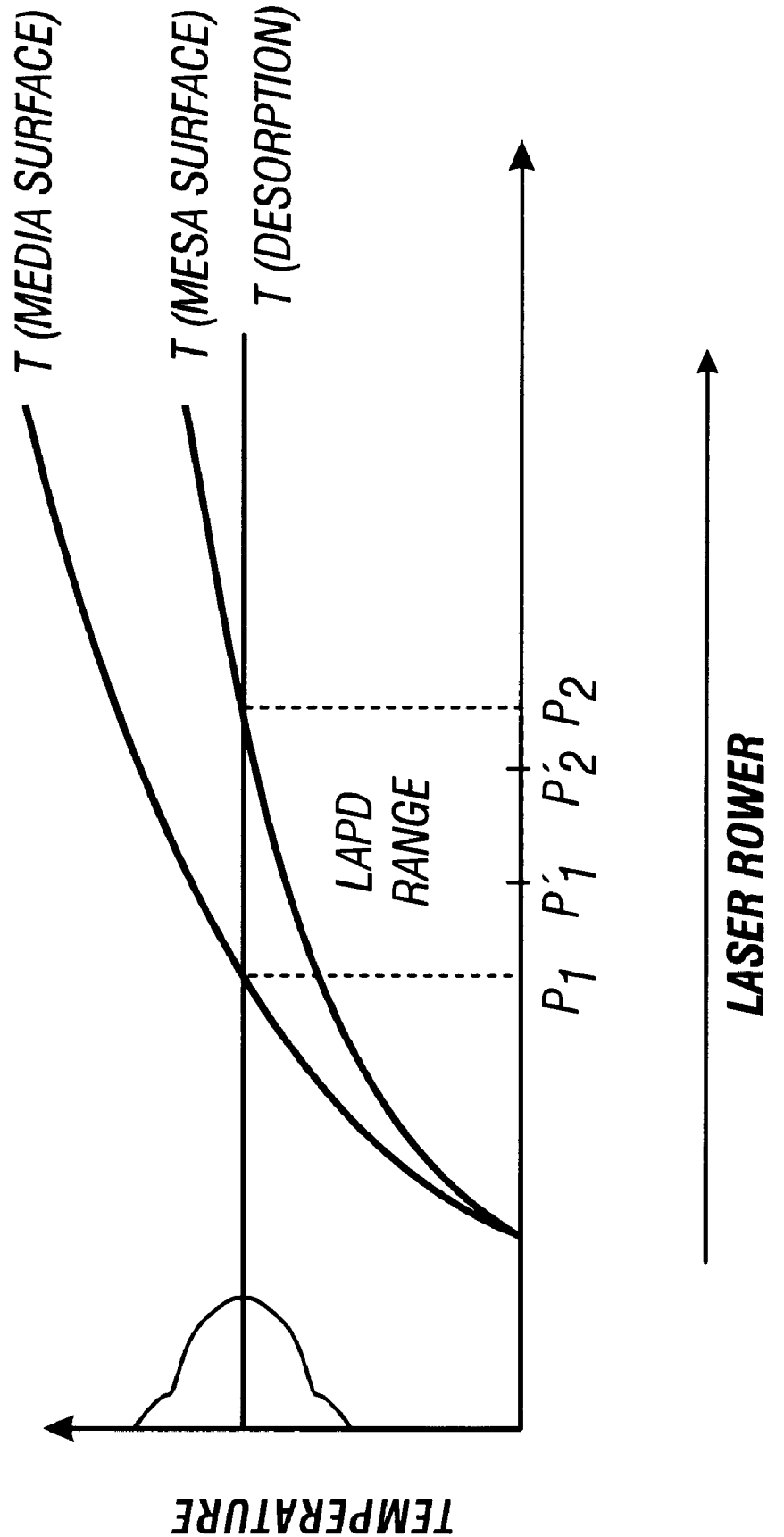
FIG. 4A shows surface temperature variations of the optical head and the medium as a function of the laser power.

FIG. 4A is a plot of temperatures of the medium surface and the surface of the optical head closest to the medium surface that are illuminated by the light beam as functions of the laser power. The temperature of the medium surface increases with the laser power due to the increased absorbed energy by the medium. Because thermal energy can be transferred from the medium through the air gap to the optical head, the temperature of the surface of the optical head and even the bulk temperature of the optical head increases with the laser power. In absence of other thermal management techniques, the temperature of the medium surface is usually higher than that of the surface of the optical head at any given laser power.

Assume the desorption temperature for a particular species is higher than the ambient temperature and is the same at both the medium surface and the surface of the optical head. At a low laser power when the temperature of the medium surface is below the desorption temperature, these species remain adsorbed and no mass transport for that species from the medium occurs. Accordingly, no mass transfer from the medium to the optical head occurs and no signal distortion is observed.

As the laser power increases to a level at P1 (FIG. 4A), the temperature of the medium surface increases to the desorption temperature. The species adsorbed on the medium surface become volatile and desorbed. Hence, mass transport from the medium surface occurs. At the laser power P1, the surface temperature of the optical head is below the desorption temperature and therefore the desorbed particles of that species from the medium surface are adsorbed by the surface of the optical head, i.e., mass transfer from the medium surface to the optical head occurs. The adsorbed species on the optical head can produce an intensity modulation on the optical signals passing therethrough (e.g., modulating the signal intensity) and can also change the optical path length in the air gap. The latter effect modifies the effective optical thickness of the air gap at the localized position of the focused spot and hence change the performance of the thin film stack formed by the near field lens 144, the air gap, and the optical medium 150. The above effects cause signal distortions such as the distortion present in the tracking error signal. Since the degree of the mass transfer depends on the localized heating in the medium by light absorption in the recording layer, such signal distortion varies with the laser power of the read/write beam.

When the laser power increases to P2 at which the surface temperature of the optical head reaches the desorption temperature (FIG. 4A), the adsorbed species on the optical head begin to desorb and the species desorbed from the medium surface will not adsorb on the optical head. Since the temperature of the medium surface is higher than the desorption temperature, the desorption of the species from the medium surface continues and increases if the laser power is higher than P2, but the adsorption of the species on the optical head remains zero. Hence, when the laser power is at or greater than P2, the mass transfer from the medium surface to the optical head is essentially eliminated although the mass transport from the medium surface still occurs. Therefore, no signal distortion is observed when the surface temperature of the optical head is at or greater than the desorption temperature.

Figures 7A, 7B:
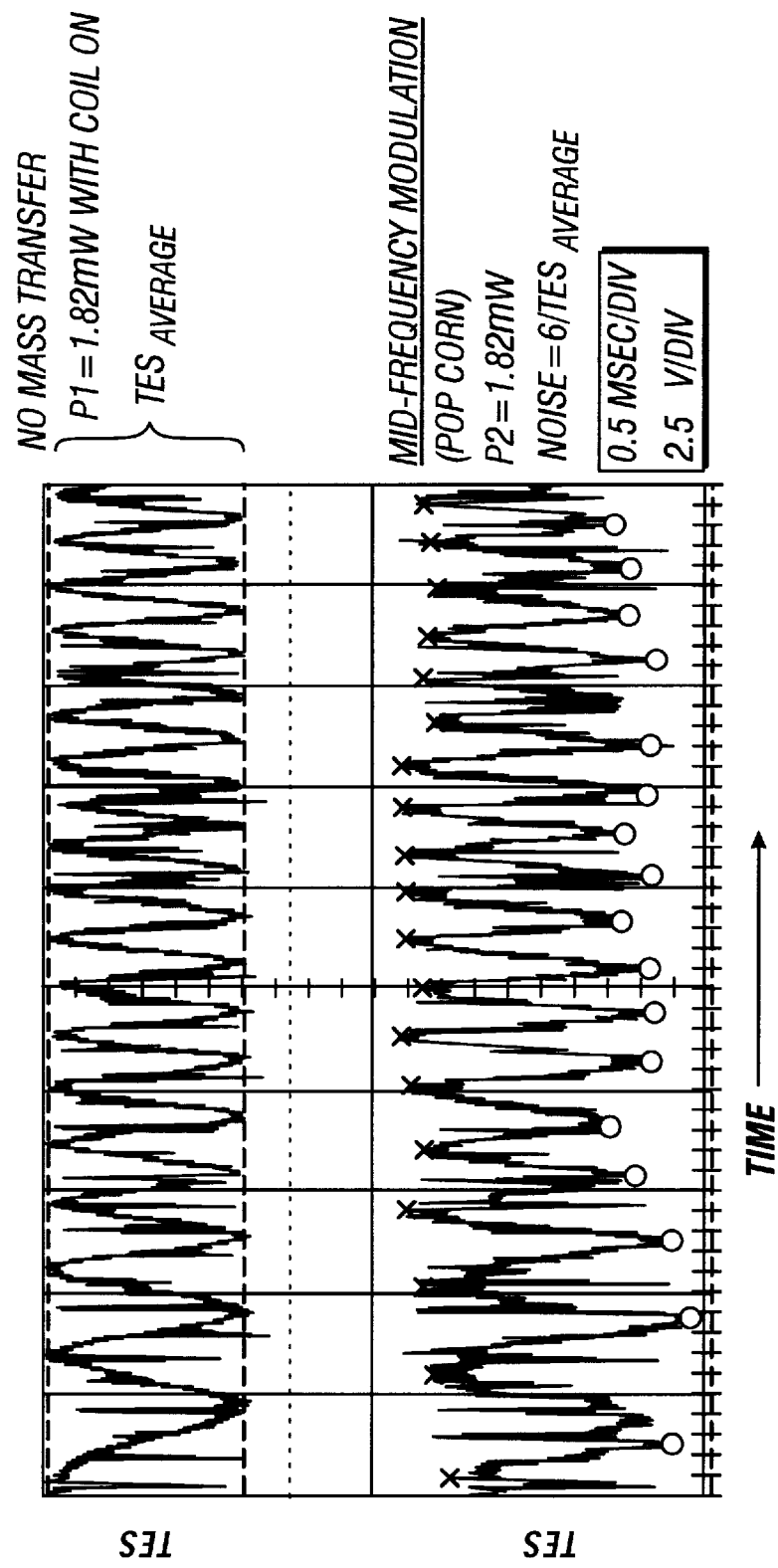
FIGS. 7A and 7B show measured tracking error signal data at the same laser power level, with and without heating of the optical head, respectively, in a magneto-optical disk drive in a near-field configuration based on FIG. 1.

Experiments have shown that such laser-power-dependent signal distortion exhibits different frequency modulations at different power levels between P1 and P2. When the laser power level is slightly above P1, the signal distortion oscillates at low frequencies on the time scale of about one rotation period (e.g., tens of milliseconds). As the laser power increases toward P2, the signal distortion exhibits mid frequency modulations on the time scale of about one millisecond in addition to the low frequency modulations. FIGS. 3B and 7B respectively show examples of such modulations.

Figure 4D:
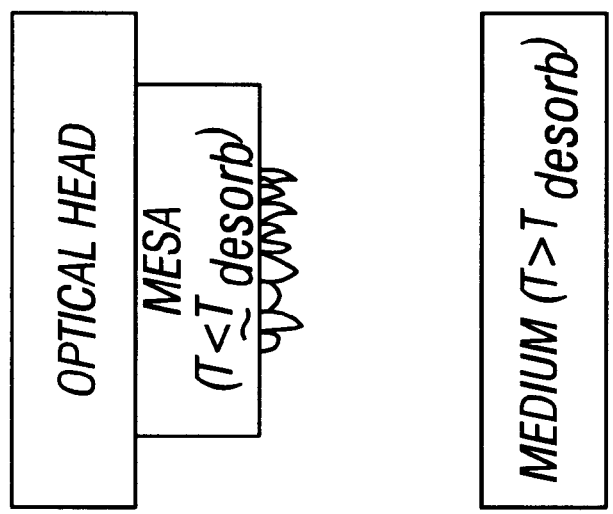
FIGS. 4B, 4C, and 4D illustrate mass transfer from the medium surface to the optical head.
Figure 4C:
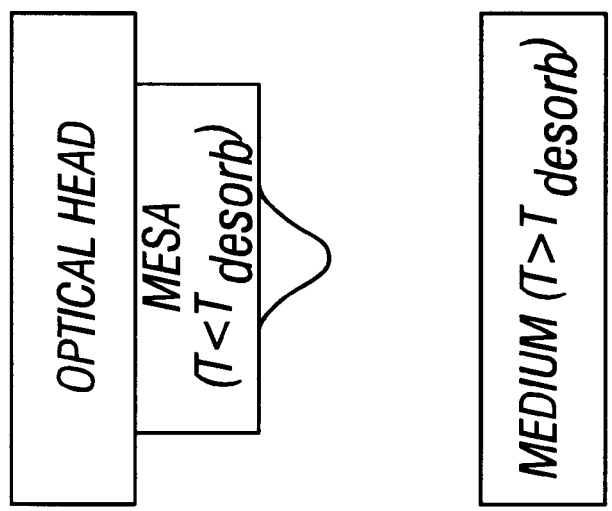
Figure 4B:
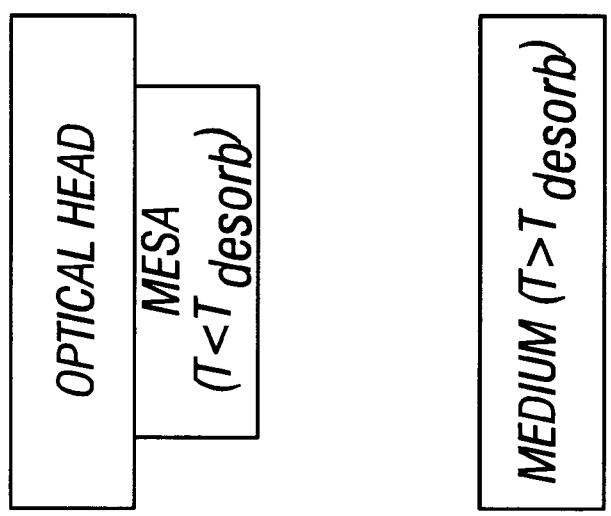

The exact causes for this change in the behavior of the signal distortion are not clear. However, it is postulated that this may be contributed by the changing dynamics of the adsorbed species on the optical head. FIGS. 4B through 4D show a proposed explanation based on formation of the adsorbed species.

When the laser power is below P1, temperatures of both the medium surface and the head surface are below the desorption temperature. No mass transfer occurs as indicated in FIG. 4B. When the laser power is above P1 but below P2', species desorbed from the medium transfer to the surface of the optical head as shown in FIG. 4C. In FIG. 4D, the laser power is at P2' which is close to P2, the head surface is near the desorption temperature. Species desorbed from the medium surface are either not adsorbed to the head surface or are adsorbed for a period shorter than the adsorption time at the power level P1'. Hence, the amount of materials accumulated on the head surface is reduced compared to the case in FIG. 4C. When the laser power is beyond P2, the head surface is above the desorption temperature and adsorbed materials become desorbed.

One way to eliminate the above signal distortion is to maintain the laser power level outside the range defined by P1 and P2, i.e., the range for which that localized heating will cause an undesired effect. In many practical optical storage systems such as magneto-optical media or phase-change media, however, the power levels for readout and recording processes often fall between P1 and P2. For example, a near-field magneto-optical drive may have a reading power of about 2 mW and an average recording power of about 7 mW while the power levels of P1 and P2 are about 0.5 mW and 20 mW, respectively. Keeping the laser power below the power level P1 during readout may not meet a desired signal-to-noise ratio. Using a laser power level above P2 for recording may also be difficult due to limited power output of the diode lasers and practical constrain on the cost of a high-power diode laser. Hence, it is often difficult or impractical to obviate the laser-power-dependent signal distortion by maintaining the laser power either below P1 or above P2.

Alternatively, the signal distortion can be reduced by either reducing the desorption from the medium surface or by reducing adsorption on the surface of the optical head.

One approach to reduce the desorption from the medium surface is to construct the structure of the medium in a special way to reduce the amount of heat transfer from the recording layer to the top surface of the medium so that the surface temperature of the medium is below the desorption temperature during reading and writing. One way to achieve this is to thermally insulate the recording layer from the medium surface by placing one or more dielectric thermal insulating layers over the recording layer. The thermal conductivity and the thickness of the insulating layer are configured in such a way that the temperature of the medium surface is below the desorption temperature in both reading and recording operations. Certain aspects of this approach are disclosed in a pending U.S. patent application Ser. No. 09/100,369, filed on Jun. 19, 1997 and assigned to the same assignee of the present application, the disclosure which is incorporated herein by reference.

Another approach maintains the temperature of the optical surface of the optical head at or above the desorption temperature, or alternatively above the local temperature of the medium surface to essentially eliminate adsorption of species on the head optical surface. The optical surface is a surface interfacing with the optical medium through the air gap and is illuminated by the optical beam during track following and seeking. In a near-field configuration, the air gap is less than one wavelength thick. In practical devices, a plurality of species of particles may exist and can transfer from the medium surface to the optical head. Different species often have different desorption temperatures at a given surface. In addition, different locations on the medium surface may have different desorption temperatures for the same species. Hence, the optical head must be maintained at or above the highest desorption temperature of all different species or all different locations on the medium surface.

In actual implementations, the temperature of the optical surface of the optical head will have to be above the surface temperature of the medium by a proper heating mechanism. If the thermodynamic properties of the two surfaces are similar so that the desorption temperatures at the two surfaces of a specie are about the same, the temperature of the optical surface of the optical head will be above the desorption temperature when the medium surface is above the desorption temperature to cause mass transport Therefore, the optical surface of the optical head does not adsorb the particles that have escaped from the medium surface.

In the above mass transfer theory, the signal distortion is caused by adsorption of certain species from the medium surface on the optical head. When the surface temperature of the optical head is higher than that of the medium surface, such signal distortion is essentially eliminated since the mass transfer from the medium to the optical head is eliminated.

Because the highest temperature of the medium surface of a given medium can be determined by the operating power range of the laser beam during both readout and recording, the optical surface of the optical head may be heated above this highest temperature at all times. Alternatively, the heating to the optical surface of the optical head may be varied according to the medium surface temperature but maintained at a higher temperature than the medium surface.

In general, any suitable heating mechanism may be used to raise and maintain the temperature of the optical surface of the optical head above the desired temperature. The heating may be directly applied to the optical surface of the optical head by using a surface heating element attached to the surface, or by bulk heating of a part of the optical head that is adjacent to the optical surface (e.g., a slider body, the mesa structure, or a near-field lens), or simply heating the entire optical head. However implemented, the temperature of the optical surface that couples the optical beam should be higher than the surface temperature of the medium at the location illuminated by the optical beam.

A thermal control unit may be used to control the heating power so that the heated optical surface of the head is at a desired temperature or temperature range. A temperature sensor may be suitably disposed to measure the surface temperature of the optical surface and to provide the temperature information to the thermal control unit for adjusting the heating power. Alternatively, the amount of the heating power may be predetermined and pre-set for anticipated operating conditions of the disk drives.

Various electrical and optical heating techniques are described here as examples. Any one or any combination of these techniques may be implemented, depending on the specific requirements of a particular optical storage system.

1. Electrically Heated Optical Head

One or more electrical heaters may be integrated to the optical head to provide localized heating to the optical head and maintain the temperature of the optical surface at a desired temperature. The heat is generated due to the ohmic loss in the heating element and can be conveniently controlled by controlling the electrical power to the heating element.

Figure 5A:
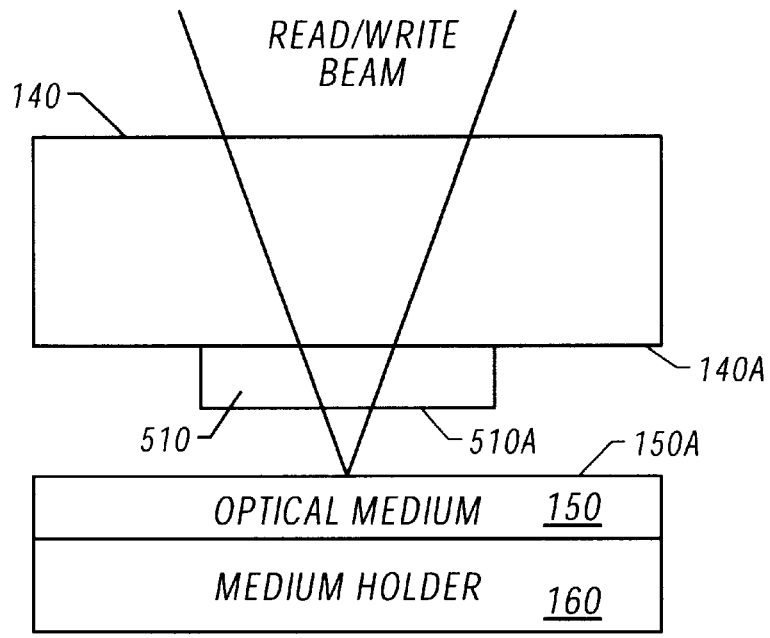
FIGS. 5A and 5B show two embodiments of a heating element for the optical head.

FIG. 5A illustrates one implementation that uses a transparent surface heating element 510 formed on the optical head 140 in the optical path of the signals. The optical head 140 has an optical surface 140A that interfaces with the optical medium through the thin air gap. The optical surface 140A can be a surface of the near-field lens 144 (e.g., the flat surface if a SIL) or a flat surface of a transparent mesa formation for accommodating a magnetic coil in a magneto-optical drive. The surface heating element 510 is formed over an area on optical surface 140A in the path of the optical signals, forming a new optical surface 510A. The area of the surface heating element 510 is in general sufficiently large to encompass the beam spot size and spatial scanning range on the optical surface 140A and more preferably is much larger than the beam spot size. The thickness of the surface heating element 510 can be selected to optimize the recording signal and in general is a function of the refractive indices of the surface heating element 510 and the material that forms the optical surface 140A, electrical resistivity and optical absorption of the surface heating element 510. The typical thickness of the surface heating element 510 is less than one wavelength and greater than about 10 nm when the system is in a near-field configuration.

The surface heating element 510 can be configured to generate a sufficient amount of thermal energy to maintain its temperature above the maximum temperature of the medium surface 150A. For example, in a rewritable drive, the laser power for data recording is higher than the laser power for data readout, thus the temperature of the surface heating element 510 may be higher than the temperature of the medium surface during data recording.

A transparent conducting layer, e.g., indium-tin oxide ("ITO") and other doped oxides, may be used to form the surface heating element 510. An electrical power supply is connected to inject a current to the transparent conducting layer and to generate a desirable amount of heat.

Figure 5B:
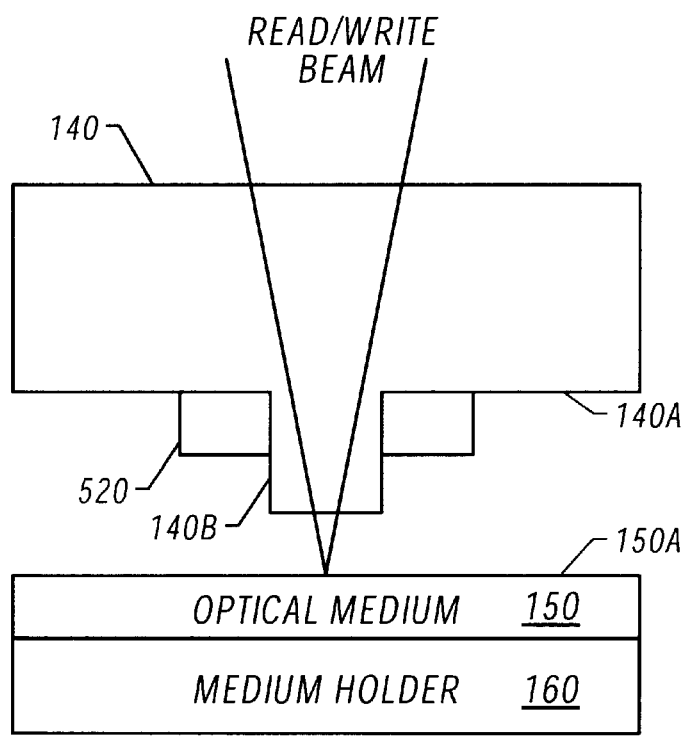

FIG. 5B shows another implementation in which a bulk heater 520 is used. A transparent mesa structure 140B is formed in the optical head 140 for coupling light between the head 140 and the optical medium 150. The bulk heater 520 can be a coil formed around the mesa 140B to provide sufficient heat to the optical surface 140A of the mesa 140B without blocking the optical path. A heating coil or a thin-film resistor, for example, can be used as the bulk heater 520. In a near-field magneto-optical storage system, a magnetic coil may be placed around the mesa 140B to generate a desired magnetic field. The magnetic coil may be separated from the heating coil or the heating coil may be used to provide both heating and the magnetic field. Examples of different mesa formations are disclosed in the incorporated U.S. patent application Ser. No. 08/846,916.

FIGS. 6A through 6D show exemplary heaters that can be used to heat either portions of the mesa that are adjacent to the optical surface that couples optical energy between the head and the medium or the optical surface itself.

Figure 6A:
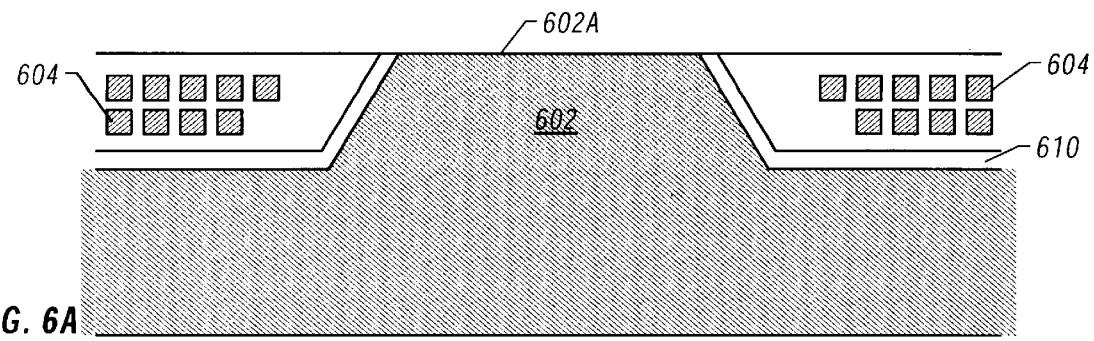
FIGS. 6A, 6B, 6C, and 6D show different embodiments of a heating element for an optical head with a mesa.

FIG. 6A shows a mesa 602 and a magnetic coil 604 that are integrated as a part of the optical surface 140A in the optical head 140 shown in FIG. 1. The mesa 602 is formed of a transparent material and has a flat surface 602A that couples radiation to and from the optical medium 150. In a near-field configuration, the spacing between the flat surface 602A and the medium surface 150A is less than one wavelength. A heating layer 610 is formed on a side wall of the mesa 604 under the magnetic coil 604 to maintain the temperature of the flat surface 602A above the surface temperature of the medium 150. A conducting layer may be used to form the heating layer 610.

Figure 6B:
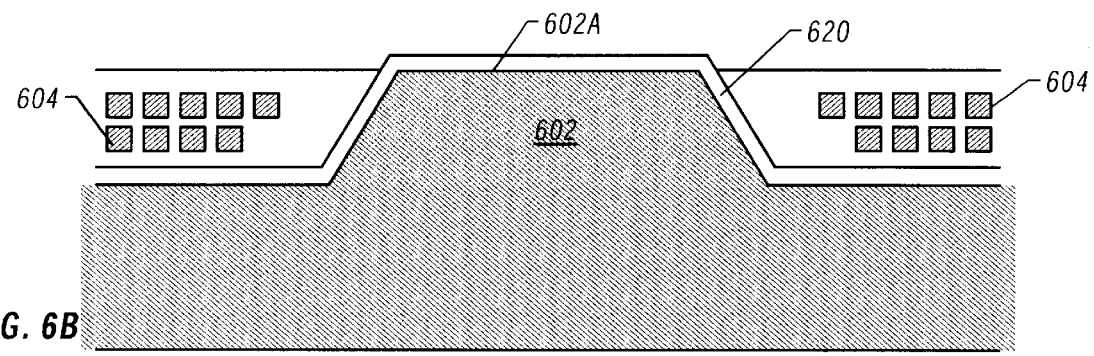

FIG. 6B uses a transparent surface heater 620 that has a first portion to cover the flat surface 602A and a second portion to cover the side wall of the mesa 602. The second portion is buried under the magnetic coil 604.

Figure 6C:
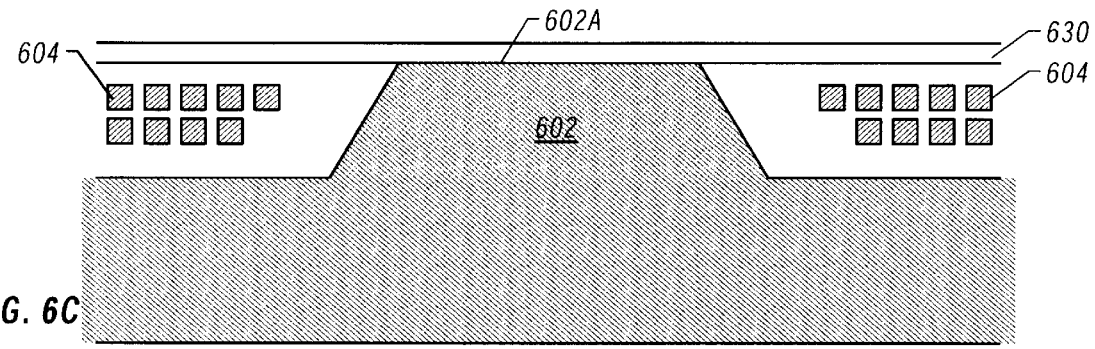
Figure 6D:
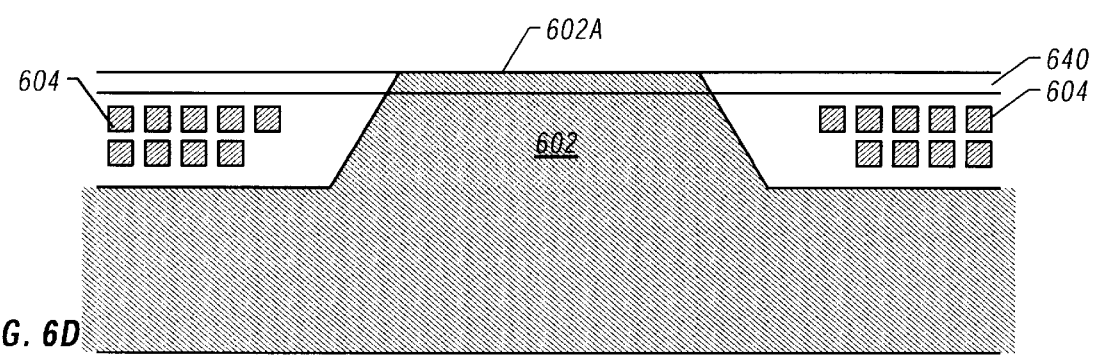

FIG. 6C shows a transparent surface heater 630 formed over the flat surface 602A and the magnetic coil 604. FIG. 6D shows a bulk heater 640 formed around the flat surface 602A over the magnetic coil 604. The bulk heater 640 may not be transparent.

FIGS. 7A and 7B show measured tracking error signal signals as a function of time in the near-field system used for measuring data shown in FIGS. 3A and 3B. A surface heating element is implemented so that the temperature of the flat surface of the SIL can be raised above the surface temperature of the medium. FIG. 7A shows the measured tracking error signal at a laser power of 1.82 mW when the heating is turned on. The laser power is much higher than the power of 0.65 mW used in measuring the data shown in FIG. 3B but no significant signal distortion is observed. When the heating is turned off, the tracking error signal shows a distortion at a frequency of about 1 kHz.

Figure 8:
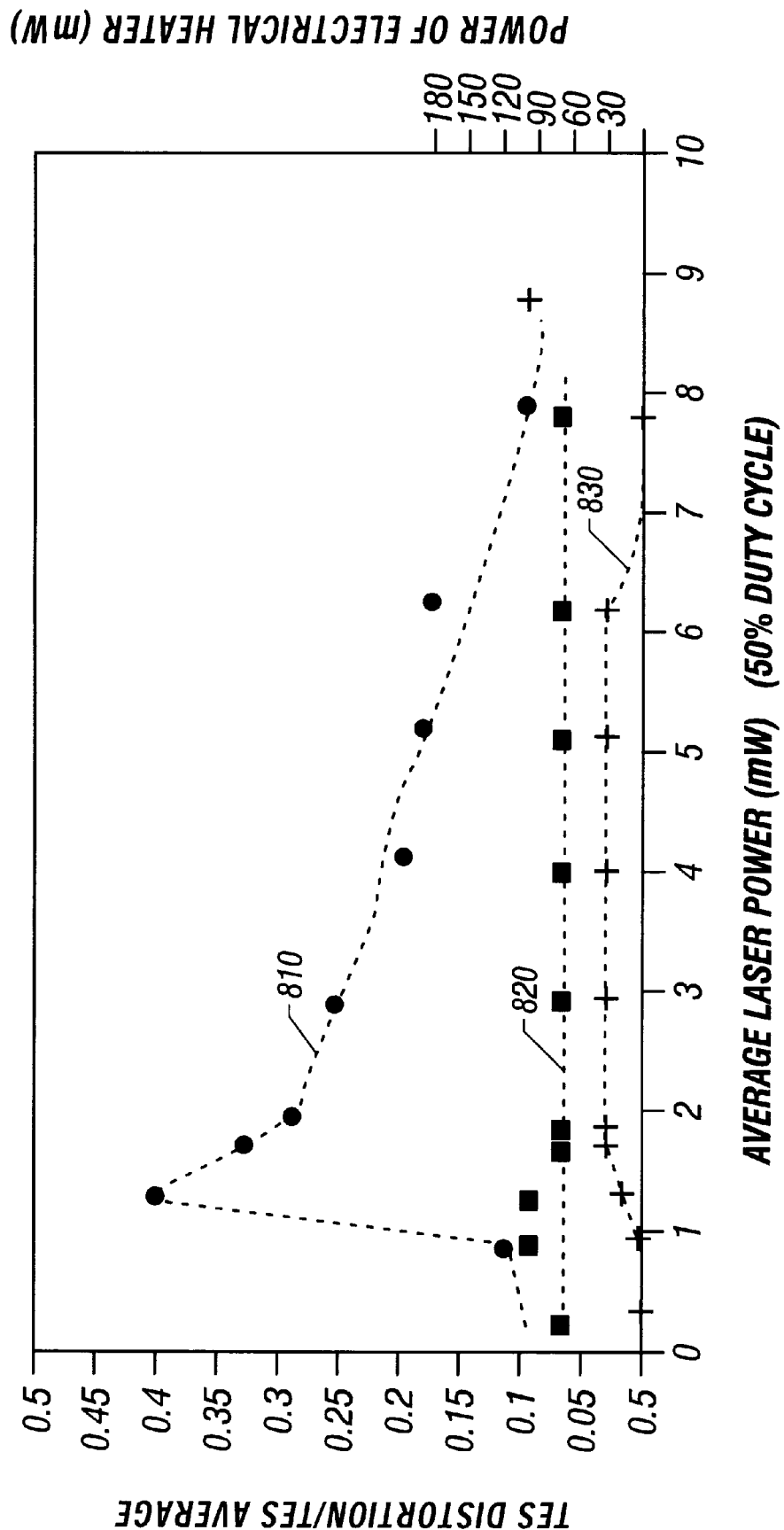
FIG. 8 shows measured tracking error signal distortion as a function of laser power when a surface heater attached to the optical head shown in FIG. 6B is turned on and off.

FIG. 8 shows measured tracking error signal distortion as a function of laser power when a surface heater attached to the optical head shown in FIG. 6B is turned on and off. The vertical axis represents a normalized tracking error signal distortion which is the ratio of the tracking error signal distortion over the averaged tracking error signal. Trace 810 represents the measured normalized tracking error signal distortion when the surface heater is not turned on and trace 820 represents the measured normalized tracking error signal distortion when the surface heater is turned on and the electrical power to the heater is about 30 mW. The power of the surface heater is indicated by trace 830 and the vertical axis on the right hand side of the graph.

The trace 810 indicates the approximate values of the laser power levels P1 and P2 within which the laser-power-dependent signal distortion occurs. When the laser power is below 1 mW or above about 8 mW, the normalized tracking error signal distortion is low, less than about 7%. When the laser power is between 1 mW and 8 mW, the normalized signal distortion can be as high as about 30% without heating the mesa of the optical head. When the heater is turned on as indicated by the trace 830, the normalized signal distortion changes from trace 810 to trace 820 and is less than 7% when the laser power changes from 1 mW to about 8 mW. The measurements indicate that proper heating of the optical head at a desired temperature relative to the surface temperature of the medium can substantially eliminate the tracking error signal distortion.

Figure 9:
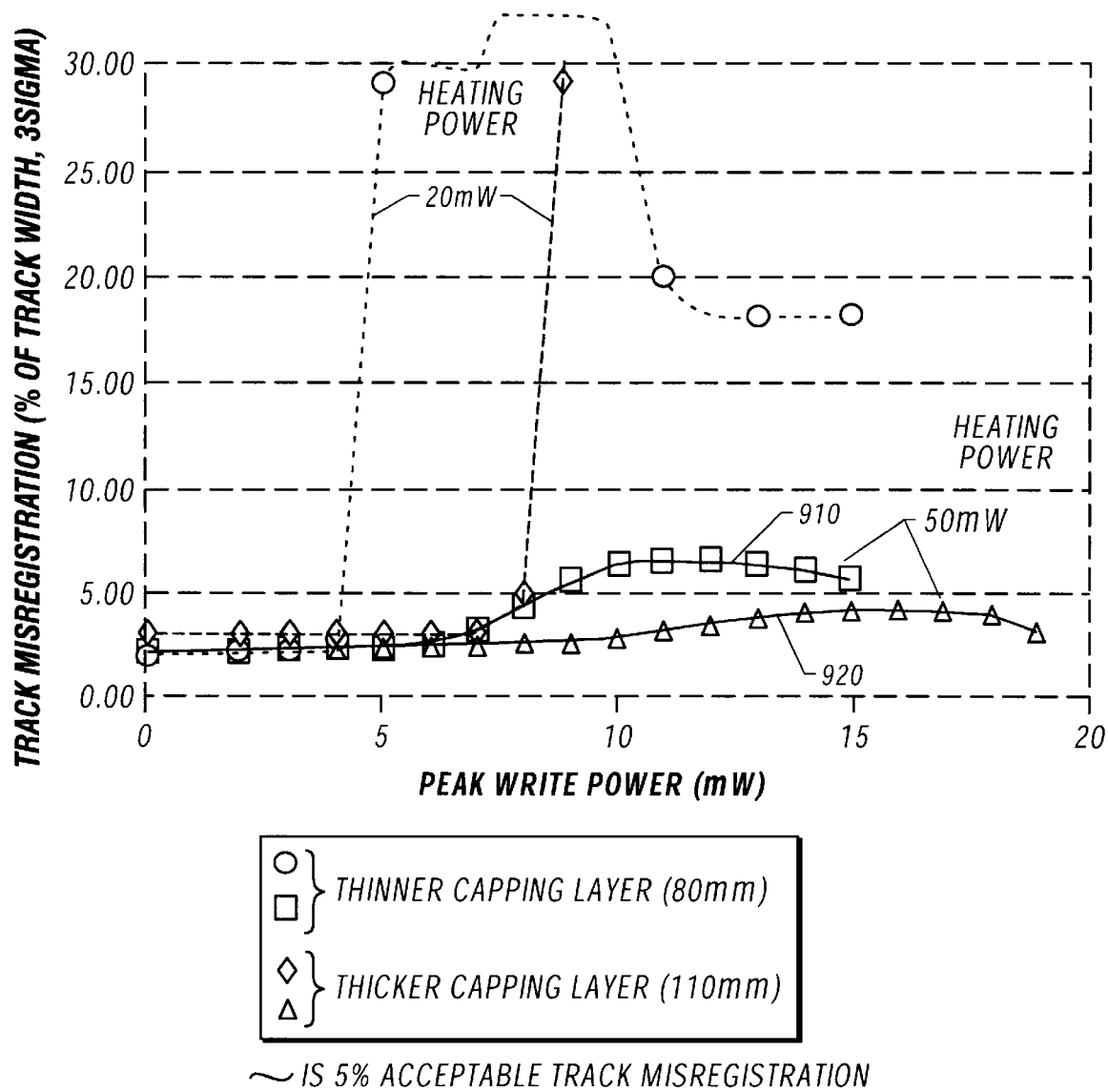
FIG. 9 shows measured track misregistration measured in percentage of the track width of a magneto-optic disk as a function of the laser power.

FIG. 9 shows measured track misregistration measured in percentage of the track width of a magneto-optic disk as a function of the laser power. The track misregistration is equivalent to the normalized distortions of tracking error signal. The optical head includes a mesa formed on a slider and a surface heating element shown in FIG. 6B is used.

Solid circles indicate the measured track misregistration by heating the mesa in the optical head with electrical power of 20 mW and 50 mW respectively. Open symbols (traces 930 and 940) show track misregistration with mesa heating of 20 mW and 50 mW, when the disk with thicker dielectric overcoat is used. Traces 910 and 920 show track misregistration when the disk with a thinner dielectric overcoat is used. When the laser power is less than 1.5 mW, the misregistration is about 2.5% indicating that the localized heating in the disk is not significant. However, as the laser power increases to greater than 1.5 mW, the misregistration increases above 100% and hence the tracking becomes impossible.

FIG. 9 further includes measured track misregistration with a disk having a thick dielectric layer. The measurements were done under the near-field configuration and the flight height of the optical head is about 100 nm. Traces 910 and 930 or 920 and 940 show the measured track misregistration for disks with different thermal insulating layer thickness values at 86 nm and 110 nm, respectively. Under heating power of 50 mW, the track misregistration is below about 7% for laser power up to about 20 mW. The misregistration of the disk with 110-nm insulating layer is smaller than that of the disk with an 86-nm insulating layer and is below about 5%. The measurements indicate that heating the optical head can effectively mitigate the laser-power dependent signal distortion.

Many suitable optically transparent and electrically conducting materials used for the surface heaters shown in FIGS. 5A, and 6B–6D have inadequate hardness and wear resistance (e.g., less than 10 GPa). In near-field operation, the mechanical interfacing between the optical head and the medium can significantly affect the performance and therefore a protection layer may be formed over the surface heater to improve the mechanical and dynamic properties of the interface between the optical head and the medium.

It is contemplated that a preferred protection layer may be formed of a hard and transparent material. A suitable protection layer may have a hardness greater than 10 GPa, or more preferably about 17 GPa or greater. Carbon materials such as hydrogenated carbons, for example, have a hardness in a range from about 17 GPa to about 25 GPa and hence can be used to form such a protection layer. In general, the thickness of the protection layer may be any value as long as the near-field configuration between the flying head and the medium is maintained and optical adsorption of the protection layer is sufficiently low (e.g., one-pass absorption is at or less than about 5%). One implementation of the protection layer is to limit its thickness to a small value (e.g., about 10 nm thick) so that the protection layer does not constitute a significant part of the optical path between the optical head and the medium. Another implementation of the protection layer is to configure it as a part of the optical path between the optical head and the medium by confining the thickness in a range between about one-eighth and about one-half of the effective wavelength within the protection layer, i.e., $\lambda/(8n_p)$ and $\lambda/(2n_p)$, where $\lambda$ is the wavelength of the read/write beam and $n_p$ is the refractive index of the protection layer.

2. Self Optically Heated Optical Head

The heating power to the optical head can also be provided by optical absorption. A lightly absorbing film may be formed on the optical surface of the optical head to provide localized heating based on light absorption of the read/write beam. Such film may be formed on the flat surface of SIL or on the surface of a mesa. The absorption coefficient of the lightly absorbing film is selected so that the heat generated by the light absorption by the film can provide sufficient heat to raise the temperature of the illuminated area of that optical surface above the temperature of the medium surface. In addition, the amount of absorption is not excessive and does not significantly attenuate the reflected signal. For example, one-pass absorption may be at or less than about 5%.

The lightly absorbing film may be formed of amorphous hydrogenated or nitrogenated carbon materials. The hydrogen or nitrogen content may be adjusted to achieve both a proper wear resistance and a proper amount of absorption.

Other suitable materials for the lightly absorbing film include indium-tin oxide, tin oxide, and indium oxide. These oxides provide good wear resistance with a hardness of about 16 GPA to about 20 GPA. The amount of absorption can be adjusted by the deposition process, which is known in the art. This embodiment simplifies the construction of the optical head.

3. Optically Heated Optical Head with Separate Heating Beam

Figure 10:
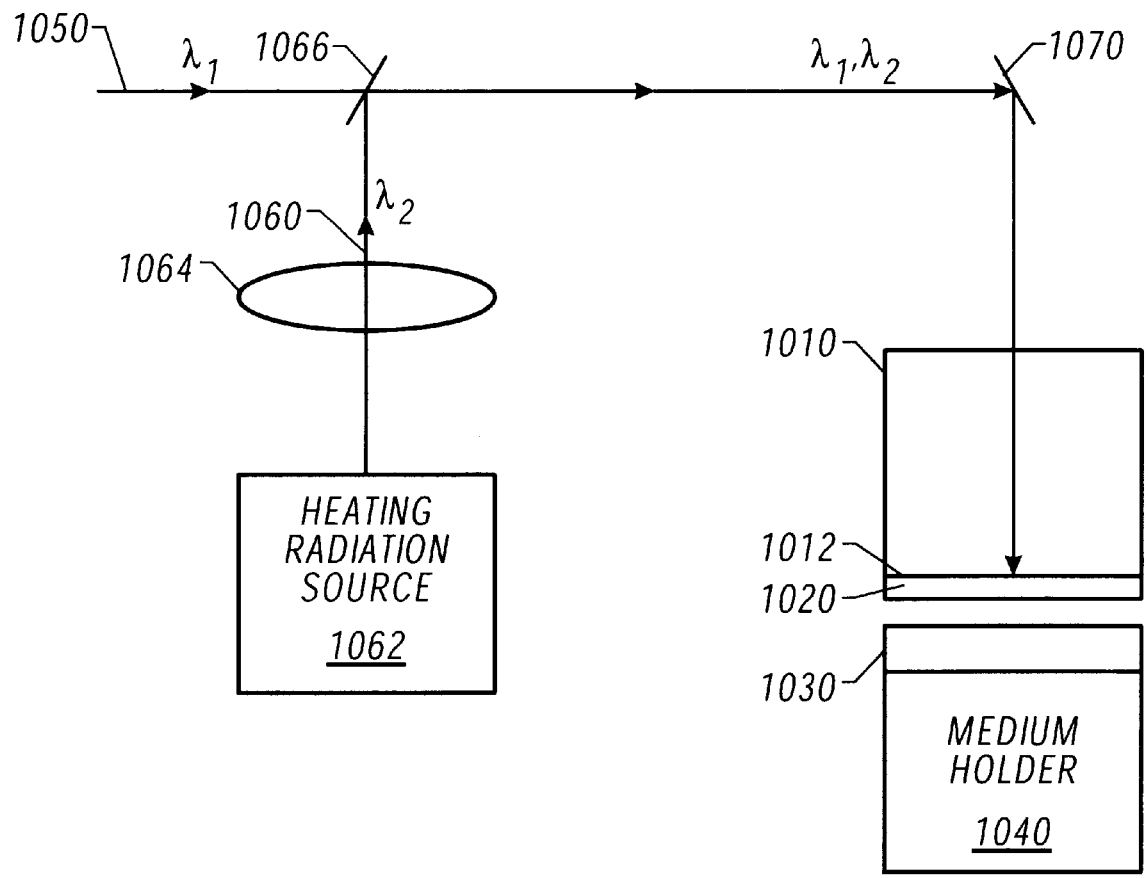
FIG. 10 shows one embodiment of an optical storage system having a heated optical head with a heating beam.

The above optical heating can also be implemented with a separate heating beam at a different wavelength than the read/write beam. FIG. 10 shows one embodiment of an optical storage system 1000 having a heated optical head with a heating beam. The optical head 1010 is coated with a light absorbing film 1020 on the optical surface 1012 that interfaces with the optical medium 1030. The optical surface 1012 may be the flat surface of a SIL or the surface of a mesa. A medium holder 1040 holds the optical medium 1030 relative to the optical head 1010 either in a far-field configuration or a near-field configuration. A read/write beam 1050 at a first wavelength $\lambda_1$ is directed to the optical head 1010 to retrieve data from or to record data to the optical medium 1030.

A separate heating beam 1060 at a second different wavelength $\lambda_2$ is also directed to the optical head 1010. A heating light source 1062 such as a light-emitting diode generates the heating beam 1060. A dichroic beam splitter 1066 and a steering mirror 1070 may be used to guide the heating beam 1060 to the optical head 1010. The heating beam 1060 projects a beam spot size larger than that of the read/write beam 1050 on the optical surface 1012 to enclose the area the read/write beam 1050 may be at during readout and recording. A lens 1064 may be used to achieve the proper projection of the heating beam 1060 onto the optical surface 1012 of the optical head 1010.

The light absorbing film 1020 is configured to absorb light at the wavelength $\lambda_2$ of the heating beam 1060 but to be substantially transparent at the wavelength $\lambda_1$ of the read/write beam 1050. Hence, the absorption of the film 1020 can be adjusted as desired without affecting the read/write beam 1050. The power of the heating beam 1060 can be independently controlled to achieve a desired temperature in the illuminated area on the optical surface 1012. Since the two beams 1050 and 1060 are at different wavelengths, the presence of the heating beam 1050 does not affect readout and recording operation by the read/write beam 1050 and the detection of the reflected signals at the wavelength $\lambda_1$ of the read/write beam 1050. The heated area on the optical surface 1020 can be easily adjusted by adjusting the lens 1064 to change the beam spot size and position of the heating beam 1060 on the surface 1020, without affecting the optical alignment of the read/write beam 1050.

Alternatively, the heating beam 1060 may be guided to the optical head 1010 by using a fiber to reduce the space required for routing the heating beam 1060 with bulk optical elements (e.g., beam splitter and mirrors).

Although the present invention has been described in detail with reference to a few embodiments, various modifications and enhancements may be made without departing from the spirit and scope of the invention. For example, the thermal insulating layer formed over the recording layer in the medium can be combined with the heated optical head.

For another example, although a hemispherical SIL is used as an exemplary near-field lens, it should be understood that the same techniques can be applied to optical storage systems with other types of near-field lenses or other near-field optical elements, including, a near-field lens formed of a radially graded index rod, a solid immersion mirror, a tapered optical fiber near-field recording head, or a high-index slider with a diffractive optical element (e.g., a diffractive lens) on a high-index transparent slider. See, Lee et al., "Feasibility study on near field optical memory using a catadioptric optical system," Optical Data Storage, 1998 Technical Digest Series, Vol. 8 and Japanese laid-open patent application No. 8-245053 by Hatakoshi et al., which are incorporated herein by reference.

Also, the heating of an optical head in a magneto-optical drive may be achieved at least in part by using the heat dissipation from the MO coil formed in the head.

The mass transfer caused by desorption at the medium surface and the adsorption by the read/write head may occur in any optical storage system including optical systems in the far-field configuration where the optical energy is coupled between the medium and the optical head by wave propagation or in optical systems in "proximity" or "pseudo-contact" recording configurations. Hence, the above techniques of maintaining the temperature of the head's optical surface that couples light to and from the recording medium above the adsorption temperature (e.g., above the surface temperature of the medium) can be implemented to improve the system performance. These techniques may also be used in magnetic disk drives in which the magnetic read/write head adsorb species that are removed from the magnetic disk. The accumulated species on the magnetic head may form a layer of deposition over time and hence affect the system performance. This undesirable effect can be reduced by implementing an electrical heating element on the magnetic head to maintain the head temperature above the desorption temperature of the commonly desorbed particles from the magnetic disk.

Furthermore, the inventors also found that proximity, or near-contact, or contact recording may be used to reduce or minimize the optical distortions and errors caused by the mass transport of species from the hot media to the head or near-field lens. In this case, the contact or occasional contact of the head with the disk surface in a controlled manner removes any species that have desorbed from the media onto the slider or lens. The above heating mechanisms of the head may still be used or may be eliminated.

These and other variations are intended to be fully encompassed by the following claims.

What is claimed is:

1. A device for retrieving data from or writing data to a storage medium, comprising:
   a head having an interfacing surface that faces a medium surface of the storage medium and interacts with the storage medium to retrieve data from or write data to the storage medium; and
   a heating element disposed on or near said interfacing surface of said head and configured to supply thermal energy to said interfacing surface and to maintain said interfacing surface at a temperature higher than a temperature of the medium surface.

2. A device as in claim 1, wherein said head is configured to retrieve data from or write data to the storage medium by coupling radiation energy through said interfacing surface.

3. A device as in claim 2, further comprising a head positioning element and a medium holder to position said head and said storage medium relative to each other to allow radiation coupling at least in part by evanescent waves.

4. A device as in claim 2, wherein said head produces a numerical aperture that is greater than unity with respect to the storage medium for coupling the radiation energy.

5. A device as in claim 2, wherein said head includes an objective lens and a radiation-coupling element that couples the radiation energy to and from the storage medium.

6. A device as in claim 1, wherein said head includes a magnetic head and is configured to retrieve data from or write data to the storage medium by magnetic signals.

7. A device as in claim 1, wherein said heating element includes an electrical heater that consumes electrical energy to produce said thermal energy.

8. A device as in claim 7, wherein said electrical heater includes a conductor layer that is at least in part formed over said interfacing surface.

9. A device as in claim 7, wherein said electrical heater includes a conductor layer formed around said interfacing surface.

10. A device as in claim 7, wherein said electrical heater includes a coil.

11. A device as in claim 1, wherein said head includes a mesa having a flat mesa surface that constitutes said interfacing surface.

12. A device as in claim 11, wherein said heating element includes a conductor layer formed over at least one of surfaces of said mesa.

13. A device as in claim 1, wherein said heating element includes a radiation-absorbing layer formed over said interfacing surface and configured to produce said thermal energy by receiving and absorbing a selected radiation.

14. A device as in claim 1, wherein said interfacing surface is maintained at a temperature higher than a desorption temperature below which certain species become adsorbed to said interfacing surface.

15. A device for retrieving data from or writing data to a storage medium through a medium surface on which certain adsorbed species become desorbed to escape from the medium surface when the temperature of the medium surface is higher than a desorption temperature, comprising:
   a head having an interfacing surface that faces a medium surface of the storage medium and interacts with the storage medium through the medium surface; and
   a heating element disposed in thermal coupling with said interfacing surface of said head and configured to supply thermal energy to said interfacing surface so that said interfacing surface has a temperature higher than the desorption temperature.

16. A device as in claim 15, wherein said head is configured to retrieve data from or write data to the storage medium by coupling radiation energy through said interfacing surface and the medium surface.

17. A device as in claim 16, wherein said head couples radiation energy to and from the storage medium at least in part by evanescent waves.

18. A device as in claim 16, wherein said head couples radiation energy to and from the storage medium by wave propagation and said head produces a numerical aperture that is less than unity with respect to the storage medium.

19. A device as in claim 15, wherein said head includes a magnetic head and is configured to retrieve data from or write data to the storage medium by magnetic signals.

20. A device as in claim 15, wherein said heating element includes an electrical heater that consumes electrical energy to produce said thermal energy.

21. A device as in claim 20, wherein said electrical heater includes a conductor layer that is at least in part formed over said interfacing surface.

22. A device as in claim 20, wherein said electrical heater includes a conductor layer formed around said interfacing surface.

23. A device as in claim 20, wherein said electrical heater includes a coil.

24. A device as in claim 15, wherein said head includes a mesa having a flat mesa surface that constitutes said interfacing surface.

25. A device as in claim 24, wherein said heating element includes a conductor layer formed over at least one of surfaces of said mesa.

26. A device as in claim 15, wherein said heating element includes a radiation-absorbing layer formed over said interfacing surface and configured to produce said thermal energy by receiving and absorbing a selected radiation.

27. A device as in claim 15, wherein said interfacing surface is maintained at a temperature higher than the local temperature of the medium surface exposed to the light beam.

28. An optical storage device for using optical radiation to write data to or retrieve data from an optical storage medium, comprising:
   an optical head having an optical surface that couples radiation energy to and from a medium surface of the optical storage medium;
   a medium holder adopted to hold the optical storage medium, and positioned relative to said optical head to allow coupling of the radiation energy between said optical surface of said optical head and the medium surface of the optical storage medium; and
   a heating element, thermally coupled to said optical surface of said optical head, and configured to supply thermal energy to maintain said optical surface above a selected temperature below which certain species become adsorbed to said optical surface.

29. A device as in claim 28, wherein said optical surface is maintained at a temperature higher than the temperature of the medium surface.

30. A device as in claim 28, wherein said medium holder is so positioned that said optical surface is spaced from the medium surface by a distance less than one wavelength of the radiation energy.

31. A device as in claim 28, wherein said optical head includes an objective lens and a solid immersion lens which has a spherical surface and a flat surface, said flat surface opposing said spherical surface and coupling the radiation energy to and from the optical storage medium.

32. A device as in claim 28, wherein said optical head includes a solid immersion mirror for coupling the radiation energy to and from the optical storage medium.

33. A device as in claim 28, wherein said optical head includes a diffractive optical element for coupling the radiation energy to and from the optical storage medium.

34. A device as in claim 28, wherein said optical head includes a radially graded index rod lens for coupling the radiation energy to and from the optical storage medium.

35. A device as in claim 28, wherein said heating element includes an electrical heater that consumes electrical energy to produce said thermal energy.

36. A device as in claim 35, wherein said electrical heater includes a conductor layer that is at least in part formed over said optical surface.

37. A device as in claim 35, wherein said electrical heater includes a conductor layer formed around said optical surface to expose at least a portion of said optical surface for transmitting the radiation energy.

38. A device as in claim 35, wherein said electrical heater includes a coil.

39. A device as in claim 28, wherein said optical head includes a mesa having a flat mesa surface that constitutes said optical surface.

40. A device as in claim 39, wherein said heating element includes a conductor layer formed over at least one of surfaces of said mesa.

41. A device as in claim 39, wherein said heating element includes a coil formed around said mesa.

42. A device as in claim 28, wherein said heating element includes a radiation-absorbing layer formed over said optical surface and configured to produce said thermal energy by receiving and absorbing the radiation energy for writing data to or retrieving data from the optical storage medium.

43. A device as in claim 42, wherein said radiation-absorbing layer is configured to have a one-pass absorption at or less than about 5%.

44. A device as in claim 42, wherein said radiation-absorbing layer includes an amorphous hydrogenated or nitrogenated carbon material.

45. A device as in claim 42, wherein said radiation-absorbing layer includes indium-tin oxide, tin oxide, or indium oxide.

46. A device as in claim 42, wherein said radiation-absorbing layer has a hardness of greater than about 16 GPA.

47. A device as in claim 28, further comprising:
a radiation source positioned relative to said optical head to provide a heating radiation beam at a heating wavelength different from the wavelength of the radiation energy for writing data to or retrieving data from the optical storage medium,
wherein said heating element includes a radiation-absorbing layer formed over said optical surface and configured to be substantially transparent to the radiation energy for writing data to or retrieving data from the optical storage medium and to absorb said heating radiation beam to produce said thermal energy.

48. A device as in claim 47, wherein said radiation-absorbing layer has a hardness of greater than about 16 GPA.

49. A device as in claim 47, further comprising a dichroic beam splitter positioned between said optical head and said radiation source to direct said heating radiation beam to said optical head.

50. A device as in claim 47, further comprising an optical fiber element positioned to guide said heating radiation beam from said radiation source to said optical head.

51. A device as in claim 28, wherein said medium holder is so configured that the optical storage medium is removable and is replaced by another removable optical storage medium.

52. A device as in claim 28, wherein said medium holder is so configured that the optical storage medium is affixed to said medium holder.

53. A device as in claim 28, wherein the optical storage medium includes a thermal insulating layer that reduces transfer of heat generated by absorption of the radiation energy by the medium to the medium surface.

54. A method for configuring and operating a data storage system that comprises a head to read data from or to write data to a storage medium by accessing the storage medium through a medium surface, comprising:
energizing the head to interact with the storage medium via an interfacing surface in the head to read data from or to write data to the storage medium; and
heating the head to raise a temperature of the interfacing surface higher than a desorption temperature below which certain species become adsorbed to the interfacing surface.

55. A method as in claim 54, wherein the head is energized by an optical beam.

56. A method as in claim 55, further comprising:
placing the head with respect to the storage medium in a near-field configuration in which the interfacing surface of the head is separated from the medium surface of the storage medium by less than one wavelength of the optical beam.

57. A method as in claim 54, wherein the head is energized by a magnetic unit capable of producing a magnetic field and sensing magnetic signals.

58. A method as in claim 54, wherein the interfacing surface is heated by an electrical heater attached to the head.

59. A method as in claim 54, wherein the interfacing surface is heated by thermal energy generated from absorption of an optical beam.

60. A method as in claim 54, wherein the temperature of interfacing surface is higher than the temperature of the medium surface.

61. A method as in claim 54, wherein the head is heated by a bulk heater that are disposed to raise the temperature of at least a portion of the head adjacent to the interfacing surface.

62. A method as in claim 54, wherein the head is heated by a layer of heat-generating element formed on or near the interfacing surface of the head.

63. A method as in claim 54, further comprising:
removing adsorbed species from the interfacing surface by contacting the interfacing surface with another surface or the storage medium in a controlled manner.

* * * * *